(12) United States Patent
Paradis et al.

(10) Patent No.: US 10,648,633 B2
(45) Date of Patent: May 12, 2020

(54) LAMP ASSEMBLIES WITH MULTIPLE LIGHTING FUNCTIONS SHARING A COVER LENS

(71) Applicant: Toyota Motor Engineering & Manufacturing North America, Inc., Erlanger, KY (US)

(72) Inventors: Alexander Paradis, Ypsilanti, MI (US); Thomas Maire, Seymour, IN (US); Jeremy Gahimer, Seymour, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 178 days.

(21) Appl. No.: 15/825,803

(22) Filed: Nov. 29, 2017

(65) Prior Publication Data

US 2019/0162385 A1 May 30, 2019

(51) Int. Cl.
| | |
|---|---|
| *F21S 41/24* | (2018.01) |
| *F21S 41/20* | (2018.01) |
| *F21S 41/60* | (2018.01) |
| *B60Q 1/18* | (2006.01) |

(52) U.S. Cl.
CPC ............ *F21S 41/24* (2018.01); *F21S 41/28* (2018.01); *F21S 41/60* (2018.01); *B60Q 1/18* (2013.01); *B60Q 2300/14* (2013.01)

(58) Field of Classification Search
CPC ............ F21S 41/24; F21S 41/28; F21S 41/60
USPC ........................................................ 362/511
See application file for complete search history.

(56) References Cited

U.S. PATENT DOCUMENTS

| | | | | |
|---|---|---|---|---|
| 6,955,459 | B2 | 10/2005 | Mochizuki et al. | |
| 8,007,149 | B2 | 8/2011 | Nagasawa et al. | |
| 8,057,081 | B2 * | 11/2011 | Schwab | B60Q 1/0041 |
| | | | | 362/511 |
| 8,820,992 | B2 | 9/2014 | Wilson et al. | |
| 2015/0338048 | A1 * | 11/2015 | Ahn | F21S 43/239 |
| | | | | 362/511 |
| 2015/0346422 | A1 * | 12/2015 | Jang | F21V 23/005 |
| | | | | 362/511 |
| 2016/0084462 | A1 * | 3/2016 | Suwa | F21S 41/143 |
| | | | | 362/511 |
| 2016/0109084 | A1 * | 4/2016 | Potter | F21S 41/24 |
| | | | | 362/511 |
| 2016/0193955 | A1 * | 7/2016 | Ogata | B60Q 1/0052 |
| | | | | 362/511 |
| 2016/0356446 | A1 | 12/2016 | Okada et al. | |

FOREIGN PATENT DOCUMENTS

DE          19806526        8/1999

* cited by examiner

*Primary Examiner* — Daniel A Hess
*Assistant Examiner* — David Tardif
(74) *Attorney, Agent, or Firm* — Dinsmore & Shohl LLP

(57) ABSTRACT

A vehicle includes a front end assembly including a headlamp assembly. The headlamp assembly includes a housing that defines a cavity and an outer lens that closes the cavity. A low beam headlamp assembly is located within the cavity. A shared cover lens is located within the cavity. The shared cover lens has an illumination region. A first light guide device directs a beam of light at the illumination region. A second light guide device directs a beam of light at an area offset from the illumination region and also at the illumination region.

20 Claims, 6 Drawing Sheets

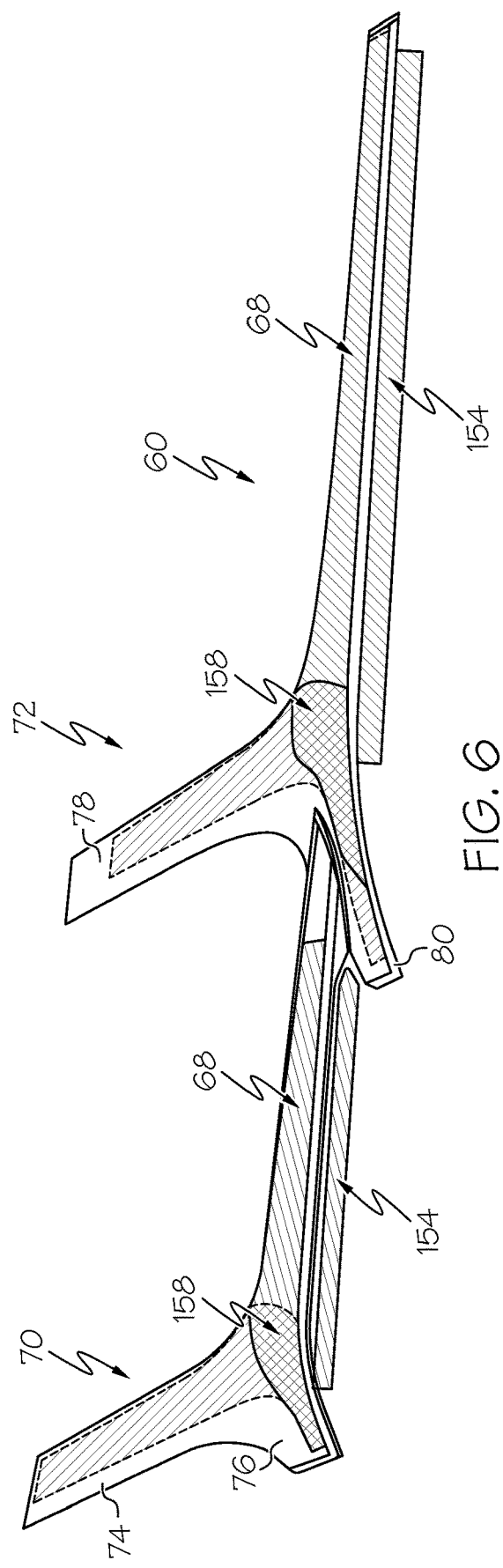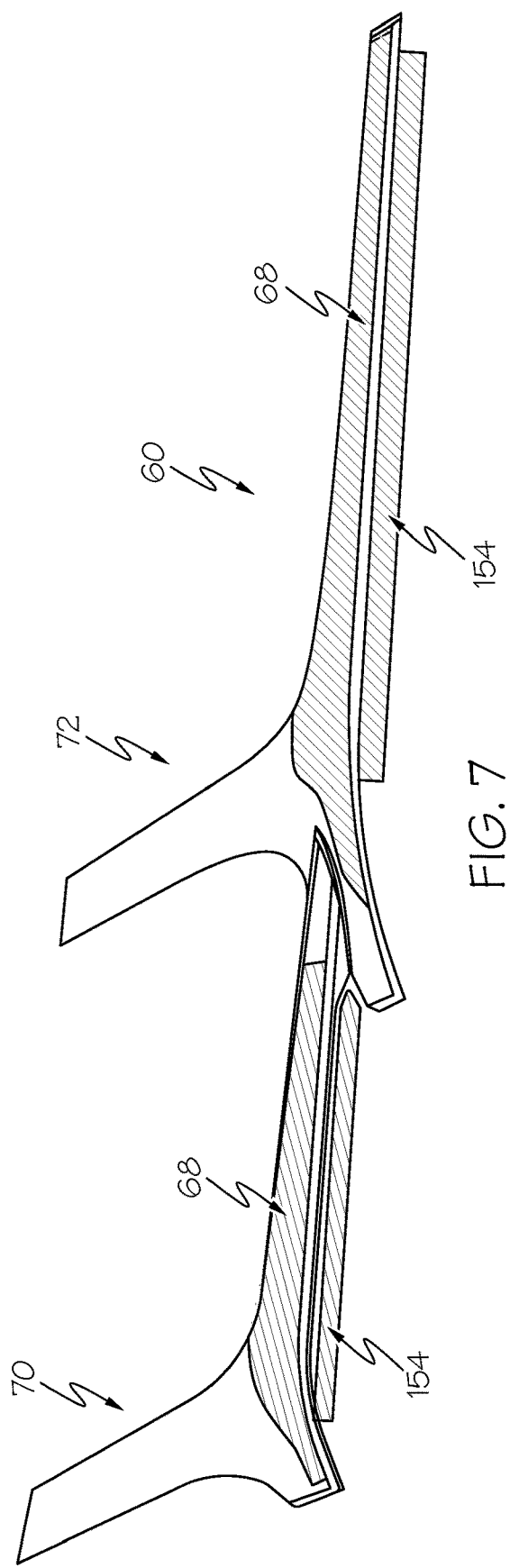

LAMP ASSEMBLIES WITH MULTIPLE LIGHTING FUNCTIONS SHARING A COVER LENS

TECHNICAL FIELD

The present specification generally relates to lamp assemblies for vehicles, and more specifically, lamp assemblies for vehicles that include lamp assemblies with multiple lighting functions sharing a cover lens.

BACKGROUND

Vehicles commonly include headlamp assemblies that can provide a number of functions. The headlamp assemblies, in addition to a primary lighting function with a low headlamp beam and a high headlamp beam, may also include other lighting functions, such as daytime running light (DRL) functions and turn functions. In some areas, one or more of the lighting functions may be regulated, such as area and/or intensity of a particular lighting function. Further, the appearance of the lighting functions may be provided in accordance with headlamp styling. However, there is limited packaging space within the headlamp assemblies to provide the various lighting functions.

Accordingly, a need exists for lamp assemblies with multiple lighting functions sharing a cover lens that also allows for sufficient area for the various lighting functions.

SUMMARY

In one embodiment, a vehicle includes a front end assembly including a headlamp assembly. The headlamp assembly includes a housing that defines a cavity and an outer lens that closes the cavity. A low beam headlamp assembly is located within the cavity. A shared cover lens is located within the cavity. The shared cover lens has an illumination region. A first light guide device directs a beam of light at the illumination region during a first lighting function. A second light guide device that directs a beam of light at an area offset from the illumination region and also at the illumination region during a second lighting function that is different from the first lighting function.

In another embodiment, a headlamp assembly includes a housing that defines a cavity. An outer lens closes the cavity. A low beam headlamp assembly is located within the cavity. A shared cover lens is located within the cavity. The shared cover lens has an illumination region. A first light guide device directs a beam of light at the illumination region during a first lighting function. A second light guide device that directs a beam of light at an area offset from the illumination region and also at the illumination region during a second lighting function that is different from the first lighting function.

In another embodiment, a method of providing additional illumination area using a cover lens of a headlamp assembly is provided. The method includes mounting a first light guide device behind the cover lens. The first light guide device directs a beam of light at an illumination region of the cover lens during a first lighting function. A second light guide device is mounted behind the cover lens. The second light guide device directs a beam of light at an area offset from the illumination region and also at the illumination region during a second lighting function that is different from the first lighting function These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 illustrates operation of a cover lens for use with the headlamp assembly of FIG. 2 according to one or more embodiments shown or described herein;

FIG. 7 illustrates operation of a cover lens for use with the headlamp assembly of FIG. 2 according to one or more embodiments shown or described herein;

DETAILED DESCRIPTION

Vehicles according to the present specification include lamp assemblies that are used to illuminate regions in a driving direction of the vehicle and also to provide other lighting functions. The lamp assemblies may include one or more primary lamps that can provide an illumination function in a vehicle driving direction, such as commonly referred to as a low beam headlamp and a high beam headlamp. The lamp assemblies also include various other optics for providing additional lighting functions. A shared cover lens is provided that provides an illumination body that can be used to direct light received from the optics. The shared cover lens may be used to provide multiple lighting functions, such as a daytime running light function and a turn light function. As will be described in greater detail below, one or more regions of the shared cover lens may be used by more than one lighting function to increase an illumination area provided during the lighting functions, without use of multiple cover lenses.

Figure 1:
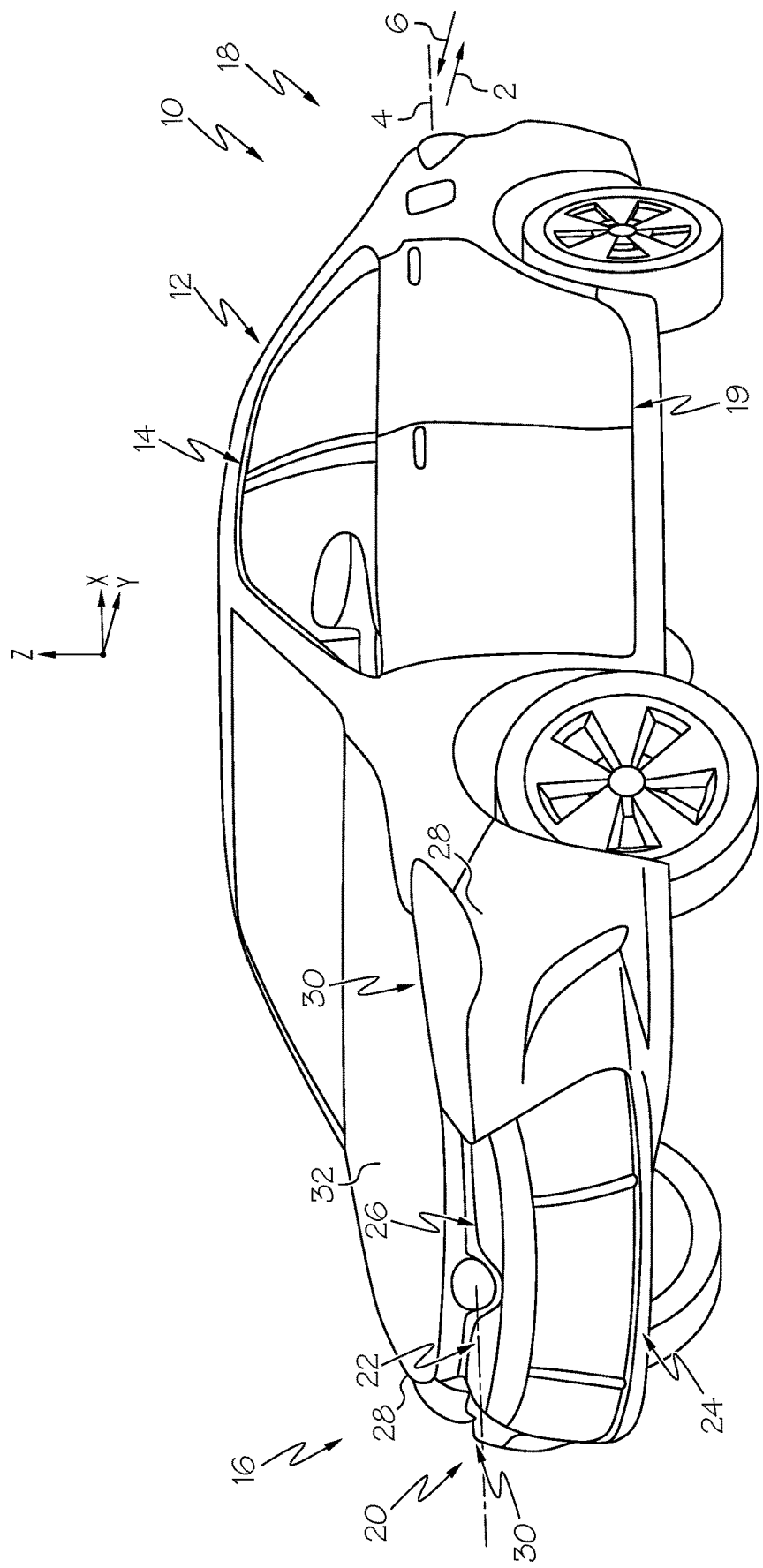
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 including a body framework 14 and having a front 16, a rear 18 and sides 19 that extend between the front 16 and the rear 18. The vehicle 10 includes a front end assembly 20 at the front 16 of the vehicle body. The front end assembly 20 includes an upper bumper cover portion 22 that extends in a vehicle-lateral direction of the vehicle 10. The front end assembly 20 may further include a lower grille assembly 24 and an upper grille assembly 26 with the upper bumper cover portion 22 disposed therebetween. The vehicle 10 may also include front fenders 28 disposed at opposite sides of the upper grille assembly 26 and the lower grille assembly 24 with headlamp assemblies 30. A hood 32 may be located above the upper grille assembly 26 that provides a cover for an engine compartment.

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

Figure 2:
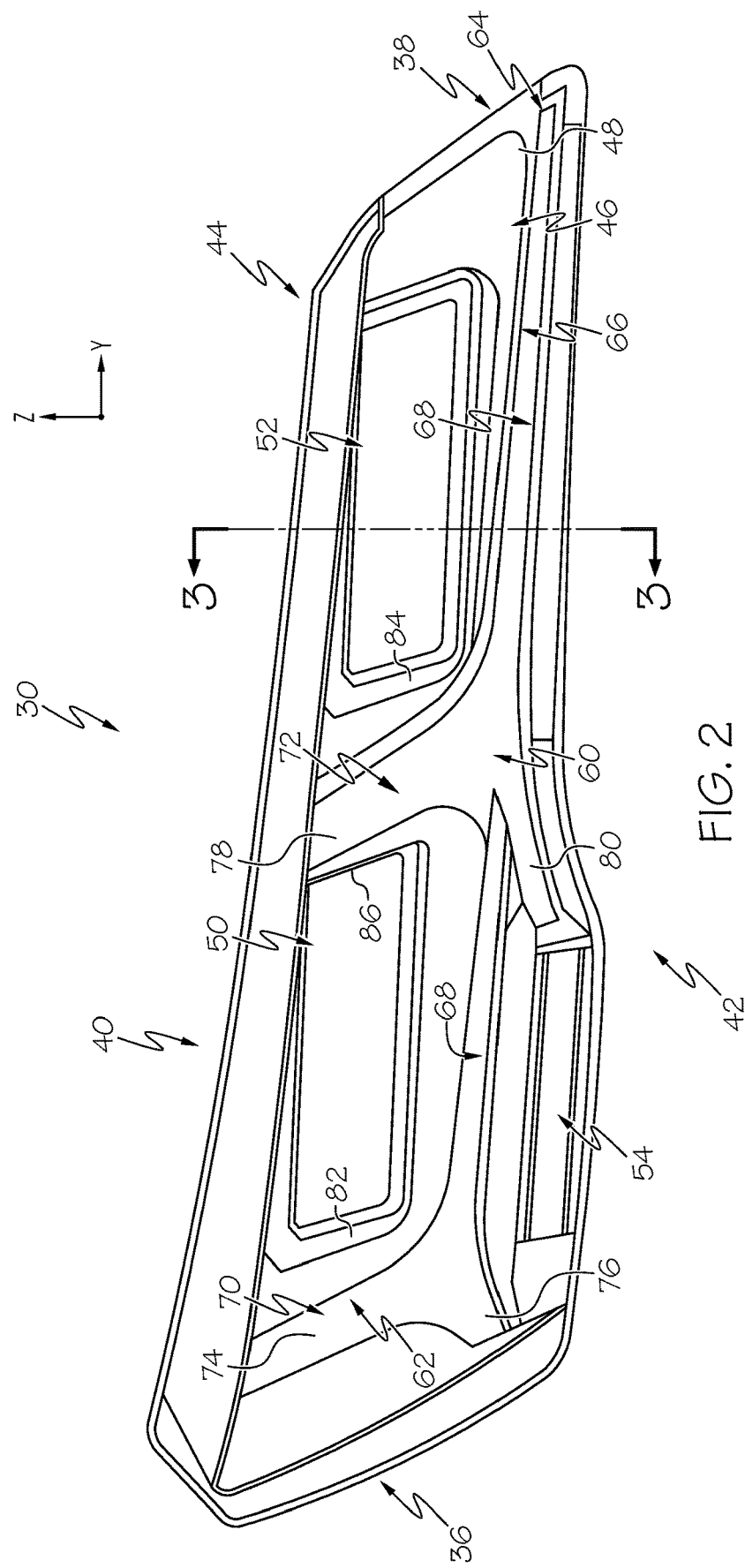
FIG. 2 illustrates a diagrammatic front view of a headlamp assembly of the vehicle of FIG. 1 according to one or more embodiments shown or described herein.

Referring to FIG. 2, the headlamp assembly 30 is illustrated in greater detail. The headlamp assembly 30 includes an outboard side 36, an inboard side 38, a top 40 and a bottom 42, where the top 40 and the bottom 42 extend between the outboard side 36 and the inboard side 38 forming a closed frame structure that extends about a periphery of the headlamp assembly 30. The headlamp assembly 30 includes a housing 44 that defines a cavity 46 that is closed by an outer lens 48 that extends in the vehicle vertical direction between the top 40 and the bottom 42 and in the vehicle lateral direction between the outboard side 36 and the inboard side 38.

A low beam headlamp assembly 50 is located within the cavity 46 and provides a distribution of light designed to provide forward and lateral illumination on the road. A high beam headlamp assembly 52 may be located within the cavity 46, adjacent to the low beam headlamp assembly 50. The distribution of light of the high beam headlamp assembly 52 may be different than the distribution of light of the low beam headlamp assembly 50. While separate headlamp assemblies are illustrated for the high and low beam functions, a single headlamp assembly may provide both of the high beam and low beam functions. A cornering lamp assembly 54 may be located below the low beam headlamp assembly 50, near the outboard side 36. The cornering lamp assembly 54 may provide an additional distribution of light directed toward the ground and may activate automatically during a cornering procedure.

The headlamp assembly 30 further includes a shared cover lens 60. The shared cover lens 60 spans across a width of the cavity 46 in the vehicle lateral direction and includes an outboard end 62, an inboard end 64 and an illumination body 66 that extends between the outboard end 62 and the inboard end 64 at a location below the low beam headlamp assembly 50 and the high beam headlamp assembly 52. The illumination body 66 includes a laterally extending portion 68, an outboard winged portion 70 and an inboard winged portion 72. The laterally extending portion 68 is a relatively linear, elongated portion, while the outboard winged portion 70 and inboard winged portion 72 extend outwardly from the laterally extending portion 68. In particular, the outboard winged portion 70 includes a first projection portion 74 that extends outwardly away from the laterally extending portion 68 and a second projection portion 76 that extends outwardly away from the first projecting portion 74, forming a somewhat Y-shape. As can be seen, the first projecting portion 74 is sized and located to extend in a vehicle vertical direction from the laterally extending portion 68 located below the low beam headlamp assembly 50 by an outboard edge 82 of the low beam headlamp assembly 50. The second projecting portion 76 is sized and located to extend alongside the outboard side 36 of the closed frame structure.

The inboard winged portion 72 includes a first projection portion 78 that extends outwardly away from the laterally extending portion 68 and a second projection portion 80 that extends outwardly away from the first projecting portion 78, forming a somewhat Y-shape. As can be seen, the first projecting portion 78 is sized and located to extend in a vehicle vertical direction from the laterally extending portion 68 located below the high beam headlamp assembly 52 by an outboard edge 84 of the high beam headlamp assembly 52 and an inboard edge 86 of the low beam headlamp assembly 50. The second projecting portion 80 is sized and located to extend alongside the bottom 42 of the closed frame structure adjacent the cornering lamp assembly 54. As described in greater detail below, the shared cover lens 60 has an optical surface that is used to display light for a variety of lighting operations. Given packaging constraints of the headlamp assembly 30, portions of the shared cover lens 60 may be used for displaying more than one lighting operation.

Figure 3:
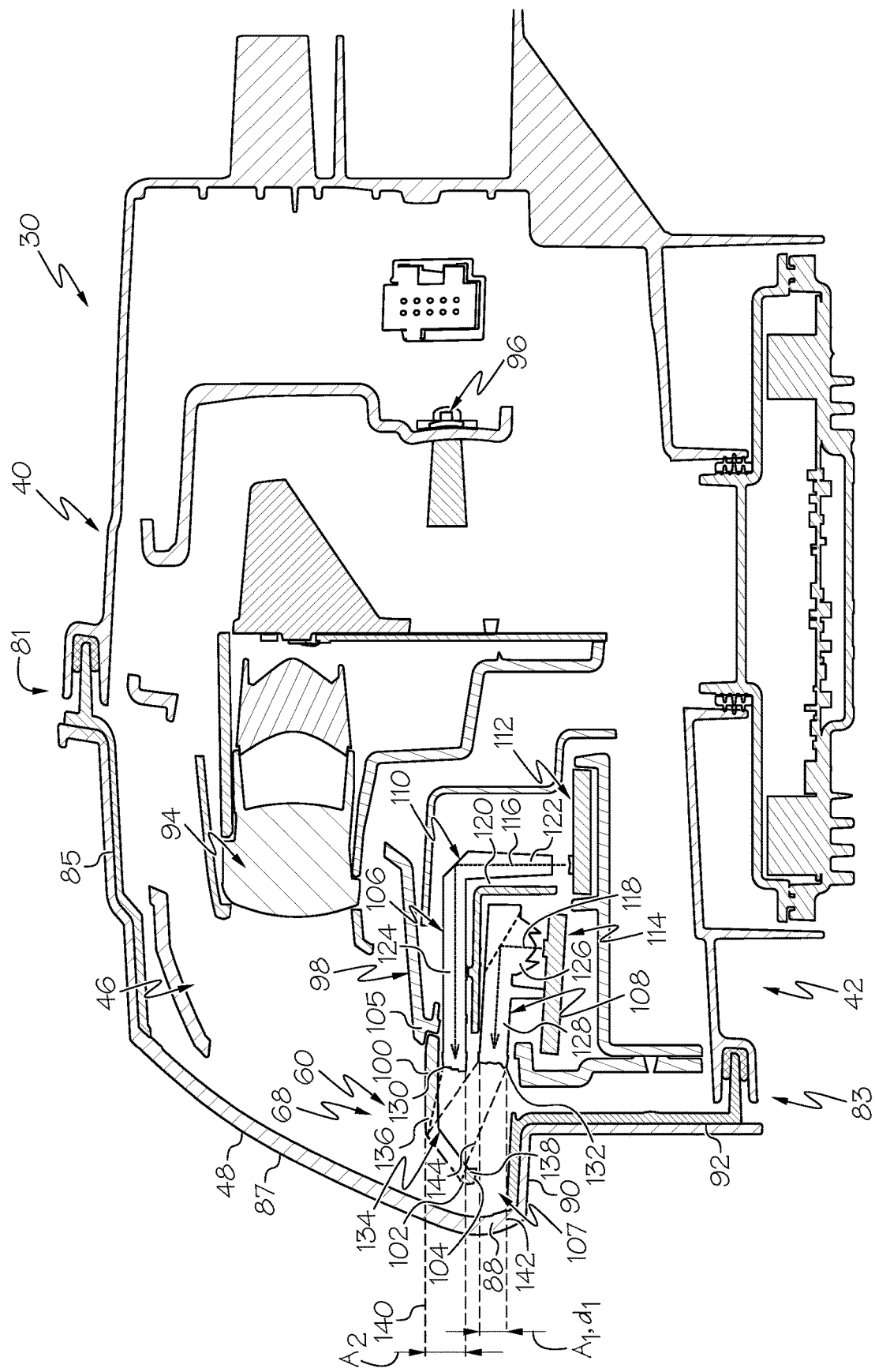
FIG. 3 illustrates a diagrammatic section view of the headlamp assembly along line 3-3 of FIG. 2 according to one or more embodiments shown or described herein.

Referring to FIG. 3, the headlamp assembly 30 with shared cover lens 60 is illustrated along line 3-3 of FIG. 2. The headlamp assembly 30 includes the top 40 and the bottom 42 that forms part of the closed frame structure described above. The outer lens 48 is connected to the top 40 at a connection location 81 of the housing 44 and to the bottom 42 at a connection location 83 of the housing 44. The outer lens 48 may be transparent to allow light to pass therethrough so that objects behind, such as the shared cover lens 60, can be distinctly seen from outside the headlamp assembly 30. At the connection location 81, the outer lens 48 has an upper connecting portion 85 that extends in the vehicle longitudinal direction and a front portion 87 that extends downward from the upper connecting portion 85 in the vehicle vertical direction. The outer lens 48 turns rearward from the front portion 87 in the vehicle longitudinal direction at a bend 88 to an under hang portion 90 and then downward in the vehicle vertical direction to a lower connecting portion 92.

A high beam headlamp source 94 is mounted within the housing 44 using a mount structure 96. The high beam headlamp source 94 may utilize, for example, halogen, high intensity discharge (HID) or light emitting diode (LED) as light sources, as examples. Located below the high beam headlamp source 94 is the shared cover lens 60.

The shared cover lens 60 may be mounted within the cavity 46 of the housing using lens mount structure 98. In particular, the shared cover lens 60 includes the laterally extending portion 68 including an upper portion 100 that extends in a generally horizontal direction in the vehicle longitudinal direction and an optical portion 102 that extends down from the upper portion 100 to a free end 104 forming a cantilevered mounting arrangement at the laterally extending portion 68. The upper portion 100 of the shared cover lens 60 may be received within a component 105 of the lens mount structure 98. The optical portion 102 extends down from the upper portion 100 toward the under hang portion 90 of the outer lens 48, terminating a distance $d_1$ from the under hang portion 90 providing a gap 107 between the shared cover lens 60 and the outer lens 48.

Located below the upper portion 100 of the shared cover lens 60 and rearward of the optical portion 102 are light guide devices 106 and 108. In the example of FIG. 3, there are only two light guide devices 106 and 108 shown for illustration; however, there may be multiple light guide devices arranged in the vehicle lateral direction, as will be described below. The upper light guide device 106 includes a light guide structure 110. A light guide structure refers to any suitable structure for directing light from one location to another, such as an optical fiber, light pipe, etc., and may include various devices, such as mirrors, lenses, and the like. In the embodiment of FIG. 3, the light guide devices 106 and 108 may be referred to as indirect as they guide light from light sources 112 and 114 (e.g., LEDs) from a vertical to a horizontal orientation, as indicated by arrows 116 and 118. A light guide mounting structure 120 may be used to mount the light guide devices 106 and 108 and their associated light sources 112 and 114 within the cavity 46.

Referring first to light guide device 106, the light guide device 106 may be L-shaped having a vertically oriented portion 122 and a longitudinally oriented portion 124. The vertically oriented portion 122 extends downward toward the light source 112 while the longitudinally oriented portion 124 extends outwardly from the vertically oriented portion 122 toward the outer lens 48 to a light emitting end 130. The light guide device 108 is located under the light guide device 106 and may be L-shaped having a vertically oriented portion 126 and a longitudinally oriented portion 128. The vertically oriented portion 126 extends downward toward the light source 114 while the longitudinally oriented portion 128 extends outwardly from the vertically oriented portion 126 toward the outer lens 48 to a light emitting end 132.

The shared cover lens 60 is located between the light emitting ends 130 and 132 of the light guide devices 106 and 108 and the outer lens 48. The shared cover lens 60 has an illumination region 134 located in the optical portion 102 that can receive and transmit light from the light guide devices 106 and 108. The illumination region 134 may be located between opaque regions 136 and 138. The opaque regions 136 have a higher opacity relative to the illumination region 134. As can be seen, the light emitting end 130 of the light guide device 106 is angled directly toward the illumination region 134. In other words, an optical axis of the light guide device 106 passes through the illumination region 134. By contrast, the light emitting end 132 of the light guide device 108 is angled offset from the illumination region 134. In other words, an optical axis of the light guide device 108 is offset from the illumination region 134. However, as may be seen in FIG. 3, the optical axis of the light guide device 108 may be offset from the vehicle longitudinal direction and angled toward the illumination region 134, which can facilitate some passage of light from the light guide device 108 through the illumination region 134. Further, the light emitting ends 130 and 132 of the light guide devices 106 and 108 may be shaped in any suitable fashion for providing a predetermined light distribution.

As represented by light beam 140, the light from the light guide device 108 is directed directly through the illumination region 134. As an example, the light beam 140 may be used to provide a DRL lighting function when activated. By contrast, as represented by light beam 142, a portion of the light from the light guide device 108 bypasses the shared cover lens 60 and passes through the gap 107 between the shared cover lens 60 and the under hang portion 90 of the outer lens 48. However, due, at least in part, to the optical axis of the light guide device 108 and/or shape of the light emitting end 132, a portion of the light passes through the illumination region 134, as represented by light beam 144.

The light guide device 108 can direct light toward two locations: the gap 107 between the shared cover lens 60 and the under hang portion 90 of the outer lens 48 and the illumination region 134, which is shaped to direct light forward in the vehicle longitudinal direction as represented by beam 140. The light guide 108 may include an optical surface at the light emitting end 132 that provides an area $A_1$ at the gap 107 that can be used for a lighting operation. Further, the light guide device 108 directing the light toward the illumination region 134 provides another optical surface at the illumination region 134, which provides an additional area $A_2$ that can be used for the same lighting operation thereby increasing the overall area $A_1+A_2$. Some lighting operations may be regulated, for example, and require a minimum light area, such as a turning lighting operation (e.g., at least 22 cm$^2$). Sharing the illumination region 134 between two different lighting operations can provide additional area for meeting such regulations. In some embodiments, $A_2$ (e.g., at least 10 cm$^2$, such as at least 12 cm$^2$, such as 12.33 cm$^2$, such as between about 10 cm$^2$ and about 15 cm$^2$) may be even larger in area than $A_1$ (e.g., at least 5 cm$^2$, such as at least 8 cm$^2$, such as at least about 10 cm$^2$, such as 10.7 cm$^2$, such as between about 5 cm$^2$ and about 12 cm$^2$). It should be noted that when light guide devices 106 and 108 are different colors, regulations may dictate that a regulated light guide device to remain activated (e.g., for turn lighting function) while a secondary light guide device (e.g., DRL lighting function) is de-activated to inhibit color mixing. In this example, the turn lighting function may be dominant, while the DRL lighting function is secondary and inactive as long as the turn lighting function is active.

Figure 4:
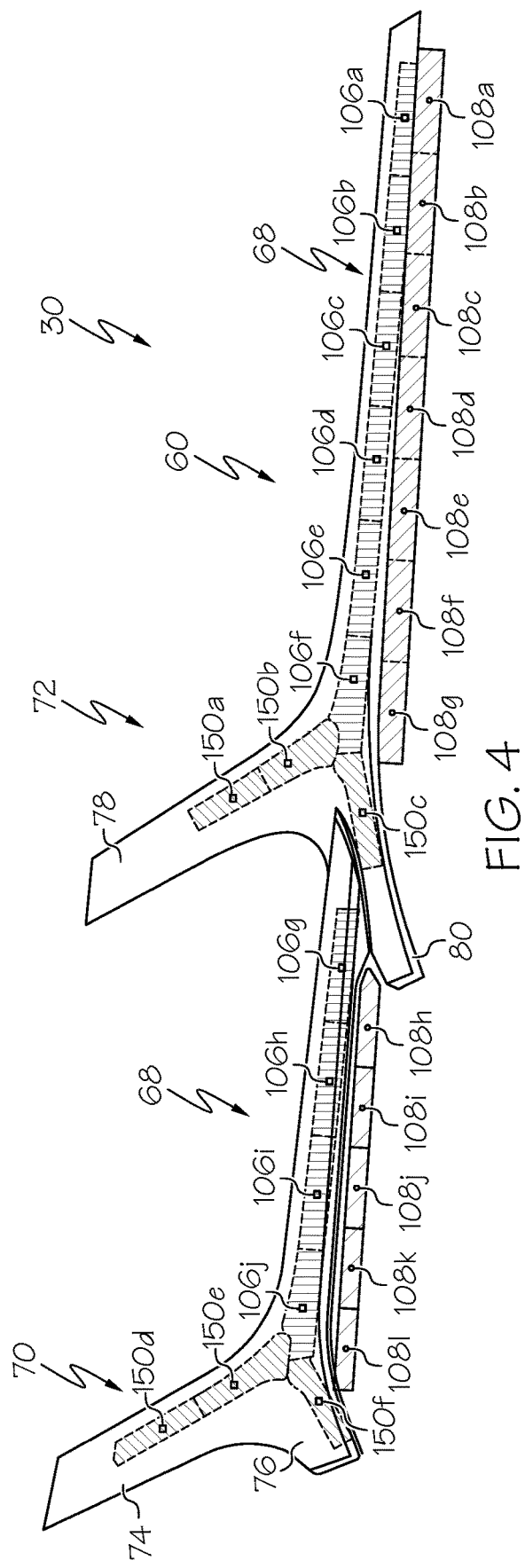
FIG. 4 illustrates operation of a cover lens for use with the headlamp assembly of FIG. 2 according to one or more embodiments shown or described herein.

Referring now to FIG. 4, additional details of the headlamp assembly 30 is illustrated in reference to the shared cover lens 60. In this example, multiple light guide devices 106a-j are located along the laterally extending portion 68. The light guide devices 106a-j may be spaced-apart an equal distance from one another in the vehicle lateral direction. While ten light guide devices 106 are illustrated, there may be more than ten or less than ten light guide devices 106. Further, multiple light guide devices 108a-1 are located beneath the shared cover lens 60, as discussed above. The light guide devices 108a-1 may be spaced-apart an equal distance from one another in the vehicle lateral direction. While twelve light guide devices 108 are illustrated providing a higher density of light guide devices 108 than light guide devices 106 along the length of the laterally extending portion 68, there may be more than twelve or less than twelve light guide devices 108. Additionally, there may be light guide devices 150a-f associated with each of the winged portions 70 and 72. In particular, the light guide devices 150a and 150b may be associated with the first projecting portion 78 of the inboard winged portion 72 and the light guide device 150c may be associated with the second projecting portion 80 of the inboard winged portion 72. Similarly, the light guide devices 150d and 150e may be associated with the first projecting portion 74 of the outboard winged portion 70 and the light guide 150f may be associated with the second projecting portion 76 of the outboard winged portion 70.

Figure 5:
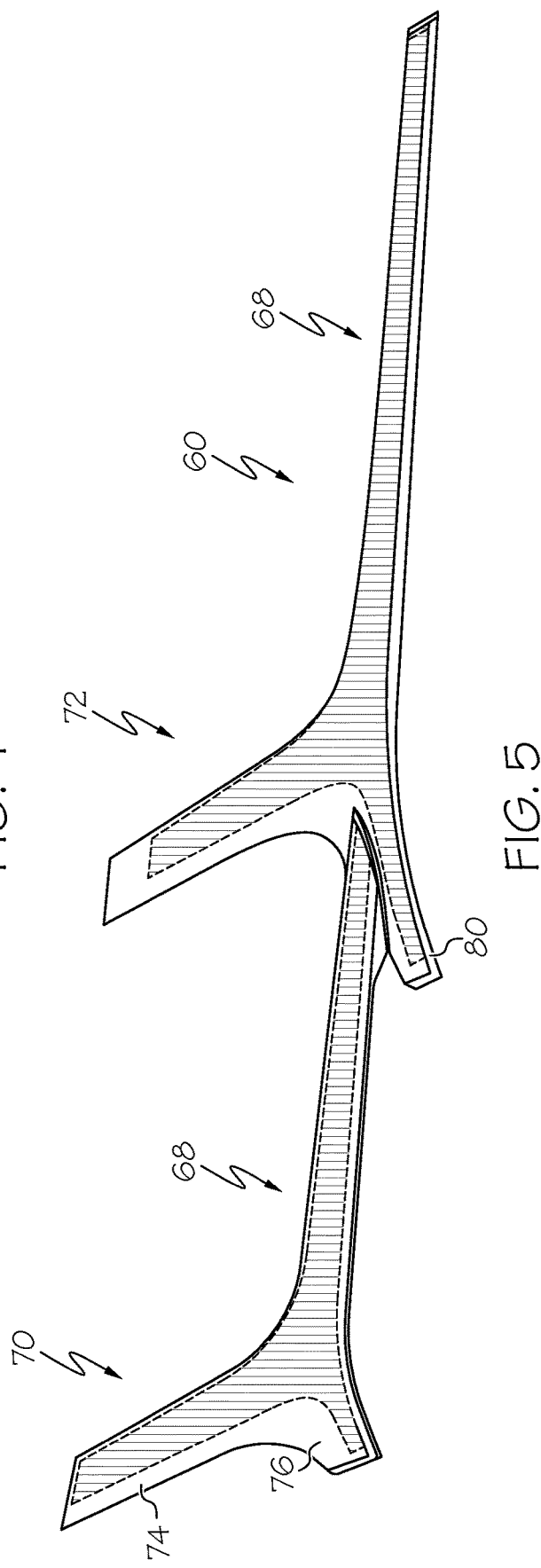
FIG. 5 illustrates operation of a cover lens for use with the headlamp assembly of FIG. 2 according to one or more embodiments shown or described herein.

FIGS. 5-9 illustrate operation of the shared cover lens 60 using the light guide devices 106a-j, 108a-1 and 150a-f. Referring first to FIG. 5, a park lighting function is illustrated where the light guide devices 106a-j are activated (i.e., turned on) providing illuminated areas corresponding to the laterally extending portion 68 and also light guide devices 150a-f are illuminated corresponding to the outboard winged portion 70 and the inboard winged portion 72, represented by the hatching. In some embodiments, the light guide devices 106a-j each provide a light beam of substantially the same wavelength, such as white, however, any suitable color may be provided. In some embodiments, the light guide devices 150a-f each provide a light beam of substantially the same wavelength, such as white, however, any suitable color may be provided. The light guide devices 150a-f may provide the light beam of substantially the same wavelength as the light guide devices 106a-j.

Referring to FIG. 6, a park plus turn lighting function is illustrated where the light guide devices 106a-j are deactivated (i.e., turned off) and the light guide devices 108a-1 are activated providing illuminated areas corresponding to the laterally extending portion 68, as represented by the hatching. Further, the light guide devices 150a-f remain activated corresponding to the outboard winged portion 70 and the inboard winged portion 72, represented by the different hatching. The light guide devices 108a-1 direct the light at areas 154 below the laterally extending portion 68 and also toward the laterally extending portion 68 that is offset from the area 154, as described above, thereby increasing the illuminated area for the turn lighting operation. In some embodiments, the light guide devices 108a-1 each provide a light beam of substantially the same wavelength, such as amber, however, any suitable color may be provided. The light guide devices 108a-1 provide a light beam of a different wavelength than the light guide devices 106a-j and 150a-f, providing a region of overlap as represented by region 158.

Referring to FIG. 7, a turn lighting operation is illustrated where only the light guide devices 108a-1 are activated providing illuminated areas corresponding to the laterally extending portion 68 and also areas 154, as represented by the hatching. Again, the light guide devices 108a-1 direct the light at areas 154 below the laterally extending portion 68 and also toward the laterally extending portion 68 that is offset from the area 154, as described above, thereby increasing the illuminated area for the turn lighting operation.

Figure 8:
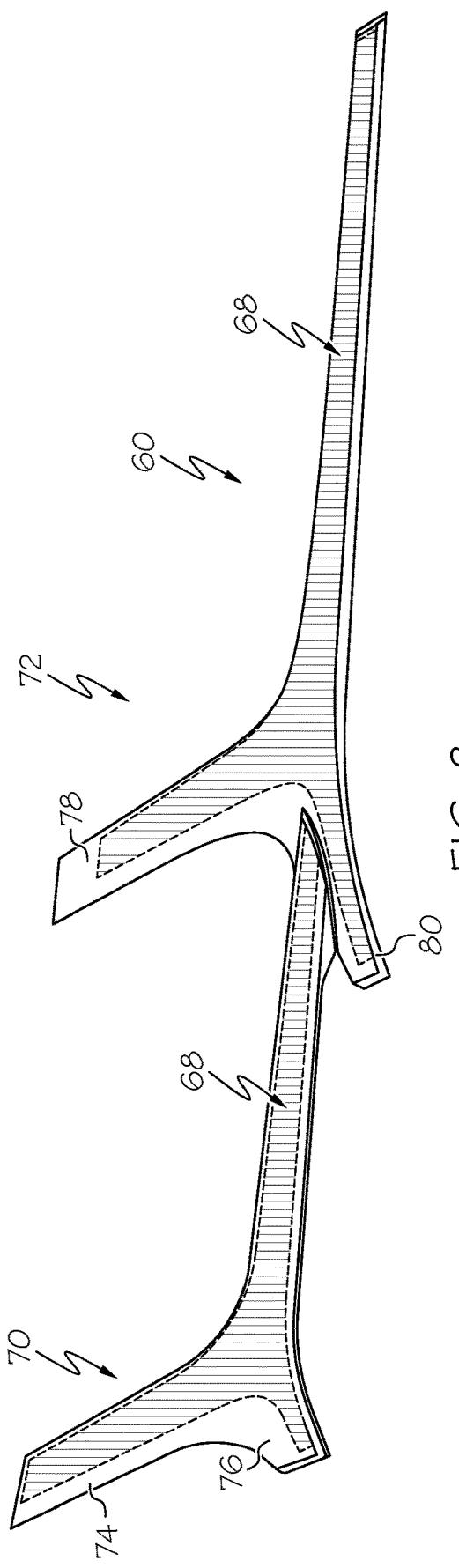
FIG. 8 illustrates operation of a cover lens for use with the headlamp assembly of FIG. 2 according to one or more embodiments shown or described herein.

Referring to FIG. 8, a DRL lighting operation is illustrated where the light guide devices 106a-j are activated providing illuminated areas corresponding to the laterally extending portion 68 and also light guide devices 150a-f are illuminated corresponding to the outboard winged portion 70 and the inboard winged portion 72, represented by the hatching.

Figure 9:
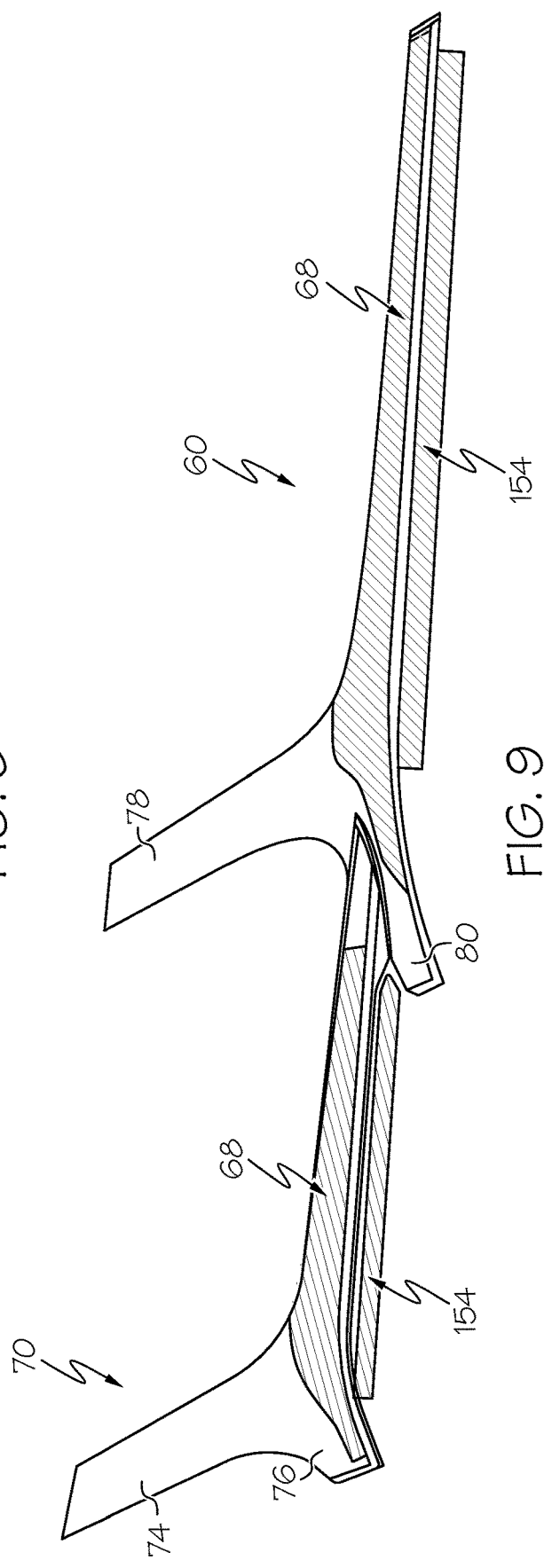
FIG. 9 illustrates operation of a cover lens for use with the headlamp assembly of FIG. 2 according to one or more embodiments shown or described herein.

Referring to FIG. 9, a DRL plus turn lighting operation is illustrated where the light guide devices 106a-j and 150a-f are deactivated to deactivate the DRL lighting function and only the light guide devices 108a-1 are activated to activate the turn lighting function. The light guide devices 108a-1 direct the light at area 154 offset from the laterally extending portion, as described above, thereby increasing the illuminated area for the turn lighting operation.

The above-described headlamp assemblies with shared cover lenses provide a shared lens arrangement where an illuminated region of the shared cover lens is shared by multiple lighting operations. In the example described above, the illuminated region may be shared by light guide devices providing both DRL lighting function and light guide devices providing turn lighting function. Additionally, the light guide devices providing the turn lighting function may also direct light offset from the illuminated region to provide an additional illuminated area for increasing the overall illuminated area during the turn lighting operation. Providing the increased area can avoid use of an additional cover lens, reduce cost and, reduce electrical current consumption. The shared cover lens may be formed of any suitable material, such as optical grade polycarbonate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a front end assembly comprising a headlamp assembly, the headlamp assembly comprising:
   a housing that defines a cavity;
   an outer lens that closes the cavity;
   a low beam headlamp assembly located within the cavity;
   a shared cover lens located within the cavity, the shared cover lens having an illumination region;
   a first light guide device that directs a beam of light through the illumination region and toward the outer lens during a first lighting function; and
   a second light guide device that directs a beam of light at an area offset from the shared cover lens and also through the illumination region and toward the outer lens during a second lighting function that is different from the first lighting function.

2. The vehicle of claim 1, wherein the first light guide device has an optical axis that passes through the illumination region and the second light guide device has an optical axis that is offset from the illumination region to provide a first portion of light to the illumination region providing a first illumination area and a second portion of light outside the illumination region to provide a second illumination area.

3. The vehicle of claim 2, wherein the first illumination area is larger than the second illumination area.

4. The vehicle of claim 2, wherein the second illumination area is larger than the first illumination area.

5. The vehicle of claim 1, wherein the first light guide device provides the first light beam having a first wavelength and the second light guide provides the second light beam having a second wavelength that is different from the first wavelength.

6. The vehicle of claim 1, wherein the shared cover lens comprises an upper portion connected to a lens mount structure and an optical portion that extends outwardly from the upper portion in a downward direction to a free end that is spaced from an under hang portion of the outer lens providing a gap therebetween, the second light guide device providing a light beam through the gap.

7. The vehicle of claim 1, wherein the shared cover lens comprises a laterally extending portion and at least one projecting portion that extends outwardly from the laterally extending portion in a vehicle vertical direction alongside the low beam headlamp assembly.

8. The vehicle of claim 6, wherein the headlamp assembly comprises a high beam headlamp assembly, the projecting portion extending outwardly from the laterally extending portion between the low beam headlamp assembly and the high beam headlamp assembly.

9. The vehicle of claim 7, wherein the shared cover lens is located between the first light guide device and the outer lens.

10. A headlamp assembly comprising:
a housing that defines a cavity;
an outer lens that closes the cavity;
a low beam headlamp assembly located within the cavity;
a shared cover lens located within the cavity, the shared cover lens having an illumination region;
a first light guide device that directs a beam of light through the illumination region and toward the outer lens during a first lighting function; and
a second light guide device that directs a beam of light at an area offset from the shared cover lens and also through the illumination region and toward the outer lens during a second lighting function that is different from the first lighting function.

11. The headlamp assembly of claim 10, wherein the first light guide device has an optical axis that passes through the illumination region and the second light guide device has an optical axis that is offset from the illumination region to provide a first portion of light to the illumination region providing a first illumination area and a second portion of light outside the illumination region to provide a second illumination area.

12. The headlamp assembly of claim 11, wherein the first illumination area is larger than the second illumination area.

13. The headlamp assembly of claim 11, wherein the second illumination area is larger than the first illumination area.

14. The headlamp assembly of claim 10, wherein the first light guide device provides the first light beam having a first wavelength and the second light guide provides the second light beam having a second wavelength that is different from the first wavelength.

15. The headlamp assembly of claim 10, wherein the shared cover lens comprises a mounting portion that is mounted to a lens mount structure and an optical portion that extends outwardly from the mount portion in a downward direction to a free end that is spaced from an underhang portion of the outer lens providing a gap therebetween, the second light guide device providing a light beam through the gap.

16. The headlamp assembly of claim 10, wherein the shared cover lens comprises a laterally extending portion and at least one projecting portion that extends outwardly from the laterally extending portion in a vehicle vertical direction alongside the low beam headlamp assembly.

17. The headlamp assembly of claim 16, wherein the headlamp assembly comprises a high beam headlamp assembly, the projecting portion extending outwardly from the laterally extending portion between the low beam headlamp assembly and the high beam headlamp assembly.

18. The headlamp assembly of claim 17, wherein the shared cover lens is located between the first light guide device and the outer lens.

19. A method of providing additional illumination area using a cover lens of a headlamp assembly, the method comprising:
mounting a first light guide device behind the cover lens, the first light guide device directing a beam of light through an illumination region of the cover lens and toward an outer lens during a first lighting function; and
mounting a second light guide device behind the cover lens, the second light guide device directing a beam of light at an area offset from the cover lens and also through the illumination region and toward the outer lens during a second lighting function that is different from the first lighting function.

20. The method of claim 19 further comprising:
providing a first lighting operation using the first light guide device having a first illumination area; and
providing a second lighting operation using the second light guide device having a second illumination area that is greater than a first illumination area.

* * * * *